United States Patent [19]

Maida

[11] 4,431,291
[45] Feb. 14, 1984

[54] INDICATING DEVICE FOR A CAMERA
[75] Inventor: Osamu Maida, Tokyo, Japan
[73] Assignee: Nippon Kogaku K.K., Tokyo, Japan
[21] Appl. No.: 424,337
[22] Filed: Sep. 27, 1982

Related U.S. Application Data

[63] Continuation of Ser. No. 265,951, May 21, 1981, abandoned.

[30] Foreign Application Priority Data

Jun. 3, 1980 [JP] Japan ................................. 55/74537

[51] Int. Cl.³ ............................................. G03B 15/02
[52] U.S. Cl. .............................. 354/127.12; 354/289.1
[58] Field of Search ..................... 354/33, 60 F, 60 E, 354/60 L, 127, 128, 289, 32

[56] References Cited
U.S. PATENT DOCUMENTS 4,131,351 12/1978 Iwata et al. ........................... 354/127
4,152,055 5/1979 Onta et al. ............................ 354/32
4,193,677 3/1980 Hasegawa et al. ................... 354/127
4,197,484 4/1980 Tanaka .................................. 354/127
4,274,724 6/1981 Nakajima ............................... 354/33
4,290,677 9/1981 Baumeister .......................... 354/127
4,306,176 12/1981 Kaneko et al. .......................... 354/33

Primary Examiner—Russell E. Adams
Attorney, Agent, or Firm—Fitzpatrick, Cella, Harper & Scinto

[57] ABSTRACT

In a camera usable with an electronic flash device and including an indicating element adapted to be operated when the electronic flash device has become capable of emitting flashlight, an electric shutter and a voltage detecting circuit for detecting the voltage of a battery for driving the electric shutter, there is provided a control circuit for rendering the indicating element inoperative in response to the output of the detecting circuit when the voltage of the battery is below a predetermined value, independently of whether or not the electronic flash device is in flashlight emission capable condition.

9 Claims, 1 Drawing Figure

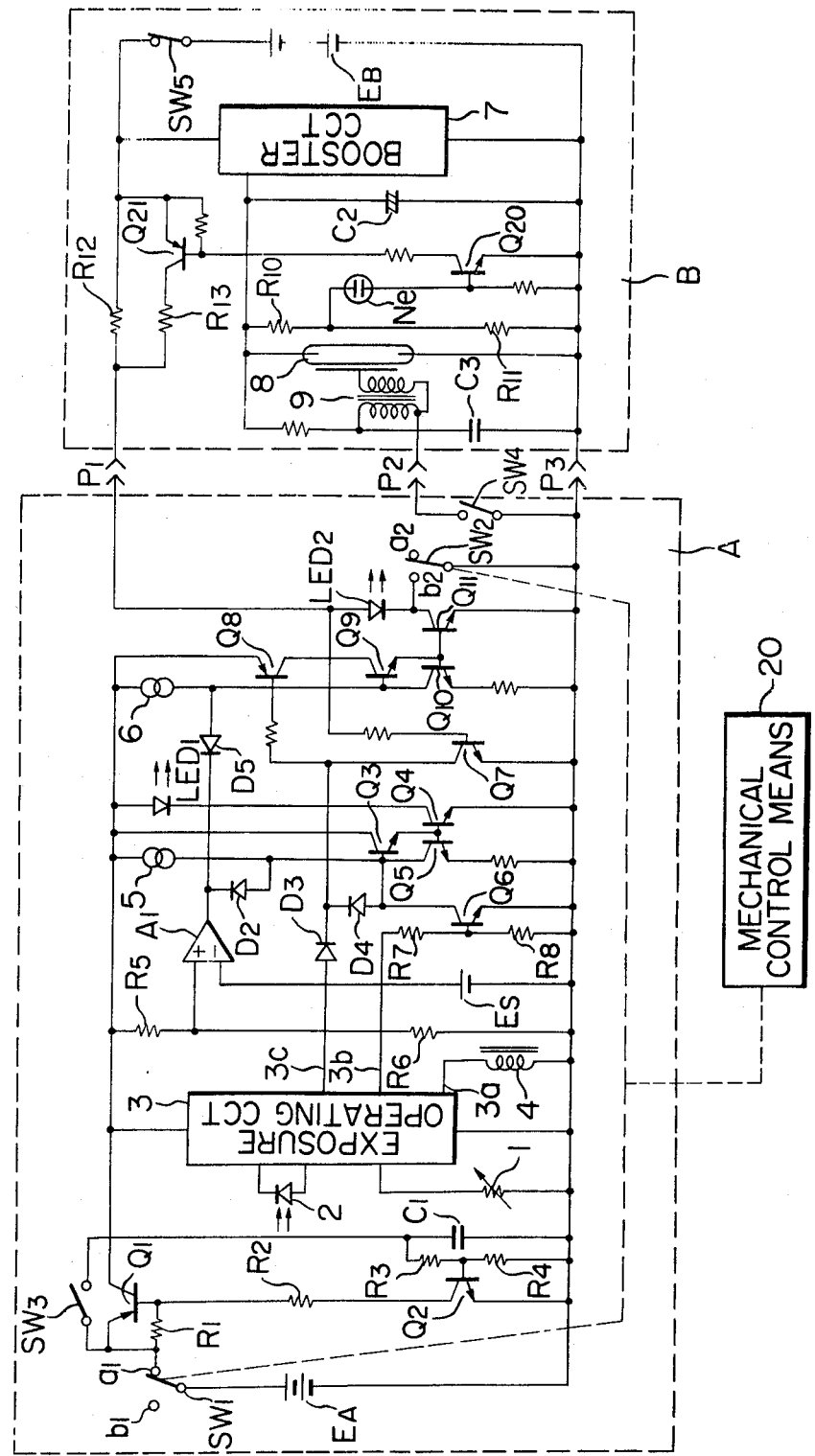

INDICATING DEVICE FOR A CAMERA

This is a continuation of application Ser. No. 265,951, filed May 21, 1981, now abandoned.

BACKGROUND OF THE INVENTION

1. Field of the Invention

This invention relates to an indicating device for a camera, and more particularly to an indicating device for a camera which indicates on the camera side that an electronic flash device is in flashlight emission capable condition.

2. Description of the Prior Art

A device is known which has in a camera an indicating lamp for indicating whether or not the charging voltage of the main capacitor of an electronic flash device has reached a predetermined value, that is, whether or not the electronic flash device is in flashlight emission capable condition, thereby enabling the indication of the flashlight emission capable condition of the electronic flash device to be viewed within the viewfinder of the camera.

The above-mentioned flashlight emission capability indicating lamp, namely, the pilot lamp, is generally turned on by the turning-on current from a power source in the electronic flash device. Accordingly, even if the battery on the camera side is consumed, the flashlight indicating lamp can be normally turned on. However, an electric shutter control which electrically effects shutter time control becomes incapable of normally operating due to the consumption of this battery, and becomes incapable of producing a shutter time suitable for flashlight photography to thereby result in failure of that photography. Similarly, in case a diaphragm aperture is electrically controlled, the aperture is not adjusted to the value suited for flash photography to thereby result in failure of that photography when the battery is consumed. On the other hand, the flashlight indicating lamp is turned on by the current from the electronic flash device and therefore, in such case, it would be usual to the photographer to think that the battery of the camera has not yet been consumed. Accordingly, it is likely enough that the photographer attempt to carry out flashlight photography by mistake.

SUMMARY OF THE INVENTION

It is an object of the present invention to forcibly render inoperative the camera side indicating element for indicating the flashlight emission capable condition of the electronic flash device when the power source voltage of the camera has dropped below a predetermined value, in order to eliminate any failure of flashlight photography which may result from the photographer's misconception of the described kind.

An embodiment of the indicating device of the camera according to the present invention will hereinafter be described with reference to the accompanying drawing.

BRIEF DESCRIPTION OF THE DRAWING

The drawing is a circuit diagram of the indicating device of the camera according to an embodiment of the present invention.

DESCRIPTION OF THE PREFERRED EMBODIMENT

Referring to the drawing which shows the circuit of the indicating device according to the present invention, this circuit comprises a camera side circuit A and an electronic flash device side circuit B, the circuits A and B being connected together by connectors $P_1$, $P_2$ and $P_3$.

The camera side circuit A will first be described. A camera side driving power source $E_A$ supplies power to the circuit A. Switches $SW_1$ and $SW_2$ are operatively associated with each other. When an electrical shutter control mode in which shutter time control is electrically effected is selected by an exposure control mode change-over member of the camera, the switches $SW_1$ and $SW_2$ are connected to their contacts $a_1$ and $a_2$, respectively. On the other hand, when a mechanical shutter control mode in which shutter time control is mechanically effected is selected, mechanical control means 20 including a mechanical governor is rendered operative and the switches $SW_1$ and $SW_2$ are connected to their contacts $b_1$ and $b_2$, respectively. A switch $SW_3$ operatively associated with a shutter button may be closed when the shutter button is depressed by a first stroke. At this time, power is supplied to the circuit A from the power source $E_A$ through the switch $SW_1$ which is then closed at its contact $a_1$. Transistors $Q_1$, $Q_2$, resistors $R_1$–$R_4$ and capacitor $C_1$ together constitute a timer circuit. This timer circuit, even if the switch $S_3$ is closed and then opened, renders the transistor $Q_1$ conductive for a predetermined time to thereby cause the power supply from the power source $E_A$ to the circuit A to continue. A variable resistor 1 has its resistance value determined by film speed and the set value of aperture, whereby the information of film speed and aperture value is transmitted to an exposure operating circuit 3. A photodiode 2 transmits object brightness information to the circuit 3. The exposure operating circuit 3 operates these types of information, calculates a proper shutter time, and produces an output on an output line 3a in a time to provide a proper shutter time after the opening of the shutter. A shutter closing magnet 4 is deenergized by the output of the line 3a and effects the closing operation of the shutter, not shown. Voltage dividing resistors $R_5$ and $R_6$ divide the voltage of the power source $E_A$. A comparator $A_1$ compares the voltage of the power source $E_A$ divided by the resistors $R_5$ and $R_6$ with the reference voltage of a reference voltage source $E_S$. When the divided voltage of the power source $E_A$ exceeds a predetermined value, the comparator $A_1$ produces an H (high) level output, and when that voltage is below the predetermined value, the comparator $A_1$ produces an L (low) level output. A shutter time indicating light-emitting diode $LED_1$ indicates within the viewfinder of the camera whether or not the shutter time calculated by the exposure operating circuit 3 is within the control range of the shutter namely, between the controllable longest shutter time and the controllable shortest shutter time of the shutter. A constant current source 5 produces a constant current. Transistors $Q_3$–$Q_5$ together constitute a current mirror circuit.

When the voltage of the power source $E_A$ is above a predetermined value and the proper shutter time calculated by the exposure control circuit 3 is within the control range of the shutter, the exposure control circuit 3 produces an output on an output line 3b and steadily turns off a transistor $Q_6$ through resistors $R_7$ and $R_8$. Accordingly, transistor $Q_4$ is turned on and at this time, the light-emitting diode $LED_1$ is steadily turned on.

When the proper shutter time calculated by the exposure control circuit 3 is outside of the control range of the shutter, the exposure control circuit 3 produces an output which periodically turns on and off the transistor $Q_6$. Accordingly, the light-emitting diode $LED_1$ is periodically turned on and off to give a warning.

When the voltage of the power source $E_A$ is below the predetermined value, the output of the compartor $A_1$ assumes L level and the current produced by the constant current source 5 is drawn into the comparator $A_1$ through a diode $D_2$. Accordingly, transistor $Q_4$ is forcibly turned off and the $LED_1$ is not turned on at all. This indicates to the photographer that photography is impossible due to consumption of the power source.

When an automatic shutter time change-over transistor $Q_7$ is turned on by a signal transmitted thereto from the flash device side circuit B via the connector $P_1$, the turn-on of the transistor $Q_7$ is transmitted to the input line 3c of the exposure operating circuit 3 through a reverse current blocking diode $D_3$. At this time, the exposure operating circuit 3 forcibly sets the shutter to a shutter time suited for flash photography. The shutter time suited for flash photography is referred to as a flash photography shutter time. Further, by the turn-on of this transistor $Q_7$, the current from the constant current source 5 is drawn into the transistor $Q_7$ through a diode $D_4$, so that the light-emitting diode $LED_1$ is turned off.

Transistors $Q_9$–$Q_{11}$ together constitute a current mirror circuit to which are connected a light-emission capability indicating diode, i.e., pilot lamp, $LED_2$, for the electronic flash device, a transistor $Q_8$ and a constant current source 6. A synchro switch $SW_4$ is closed when the shutter is fully opened. When the voltage of the power source $E_A$ is below the predetermined value, the output of the comparator $A_1$ assumes L level and therefore, the current of the current source 6 is drawn into the comparator $A_1$ through a diode $D_5$. Accordingly, at this time, the transistors $Q_9$–$Q_{11}$ are forcibly turned off and the light-emitting diode $LED_2$ is forcibly turned off.

The electronic flash device side circuit B will now be described. The circuit B is provided with an electronic flash device side power source $E_B$, a main switch $SW_5$, a booster circuit or DC-DC converter 7, a main capacitor $C_2$, voltage dividing resistors $R_{10}$, $R_{11}$ for dividing the charging voltage of the main capacitor $C_2$, a flashlight discharge tube 8, a triggering transformer 9 and a triggering capacitor $C_3$. When the charging voltage of the capacitor $C_2$ reaches a predetermined value, namely, a voltage sufficient to cause the flash device to emit flash light, this voltage is divided by the resistors $R_{10}$ and $R_{11}$ and applied to a neon tube Ne, which is thus turned on and a transistor $Q_{20}$ is turned on. By the transistor $Q_{20}$ being turned on, a transistor $Q_{21}$ is also turned on. When the transistor $Q_{21}$ is turned on, resistors $R_{12}$ and $R_{13}$ become parallel-connected. At this time, the current from the power source $E_B$ flows via both of the resistors $R_{12}$ and $R_{13}$. Accordingly, this current passes through the connector $P_1$ to turn on the camera side transistor $Q_7$ and also turn on the pilot lamp $LED_2$. The turn-on of this pilot lamp $LED_2$ may be viewed within the viewfinder of the camera.

When the transistor $Q_{21}$ has been turned off, the current from the power source $E_B$ flows only through the resistor $R_{12}$. This current is smaller than the aforementioned current flowing through both of the resistors $R_{12}$ and $R_{13}$. Accordingly, at this time, this current turns on the transistor $Q_7$ but renders the pilot lamp $LED_2$ substantially turned off.

Description will now be made of the operation of the device according to the embodiment of the present invention.

Description will first be made of a case where the switches $SW_1$ and $SW_2$ have been connected to their contacts $a_1$ and $a_2$, respectively, so as to effect shutter time control in the electrical control mode.

In this case, when the voltage of the power source $E_A$ exceeds the predetermined value, the exposure operating circuit 3 and the shutter closing magnet 4 control a right shutter time. The voltage from the power source $E_A$ divided by the voltage dividing resistors $R_5$ and $R_6$ becomes greater than the reference voltage $E_S$ and therefore, the comparator $A_1$ produces an H level output. When the proper shutter time calculated by the exposure operating circuit 3 is within the control range of the shutter, the exposure operating circuit 3 produces on the output line 3b an output which always renders the transistor $Q_6$ non-conductive. At this time, the transistor $Q_3$ is turned on by the constant current source 5, so that the transistor $Q_4$ is also turned on. Accordingly, the light-emitting diode $LED_1$ is steadily turned on. On the other hand, when the proper shutter time calculated by the exposure operating circuit 3 is outside of the control range of the shutter, the exposure operating circuit 3 produces an output which periodically turns on and off the transistor $Q_6$. At this time, the current from the constant current source 5 periodically flows via the transistor $Q_6$. Accordingly, the transistors $Q_3$ and $Q_4$ are periodically turned on and off and the light-emitting diode $LED_1$ is periodically turned on and off.

Next, when the electronic flash device B is mounted to the camera A and the switch $SW_5$ is closed, the power source $E_B$ charges the main capacitor $C_2$ through the booster circuit 7. The charging voltage of the main capacitor $C_2$ is divided by the voltage dividing resistors $R_{10}$ and $R_{11}$ and applied to the neon tube Ne.

During the time that the charging voltage of the capacitor $C_2$ does not reach a predetermined voltage, namely, a voltage sufficient to cause the electronic flash device to emit flash light, the neon tube Ne is turned off and accordingly, the transistors $Q_{20}$ and $Q_{21}$ are also turned off. Thus, the current from the power source $E_B$ passes only through the resistors $R_{12}$ and is applied to the camera side transistor $Q_7$ and pilot lamp $LED_2$. This current, which passes only through the resistor $R_{12}$, becomes smaller. Accordingly, the transistor $Q_7$ is turned on, but the pilot lamp $LED_2$ is not substantially turned on. In this manner, the turn-off of the pilot lamp $LED_2$ indicates that the flash device is not able to emit flash light. Conductivity of the transistor $Q_7$ is transmitted to the output light 3c of the exposure operating circuit 3 through diode $D_3$ and, at this time, the exposure operating circuit 3 forcibly sets the shutter to the flash photograph shutter time. Further, by the turn-on of the transistor $Q_7$, the current from the constant current source 5 flows to the transistor $Q_7$ through diode $D_4$ and therefore, the transistors $Q_3$ and $Q_4$ are turned off. Thus, the light-emitting diode $LED_1$ is turned off.

Next, when the charging voltage of the main capacitor $C_2$ has reached the predetermined voltage, the neon tube Ne is turned on by this charging voltage divided by the voltage dividing resistors $R_{10}$ and $R_{11}$, and accordingly, the transistors $Q_{20}$ and $Q_{21}$ are turned on. Thus, the current from the power source $E_B$ passes through both parallel resistors $R_{12}$ and $R_{13}$ and is applied to the pilot lamp $LED_2$ and the transistor $Q_7$. This current, which passes through both parallel resistors $R_{12}$ and $R_{13}$, becomes greater. Accordingly, it turns on the transistor $Q_7$ and also turns on the pilot lamp $LED_2$. Thus, the turn-on of the pilot lamp $LED_2$ indicates on the camera side that the electronic flash device is able to emit flash light. The magnitude of the current flowing to the pilot lamp $LED_2$ is determined by the magnitude of the current of the constant current source 6 and is independent on any voltage fluctuation of the power source $E_B$. Accordingly, it is also possible to make the brightness of the pilot lamp $LED_2$ always constant or to made the brightness of the pilot lamp $LED_2$ equal to that of the light-emitting diode $LED_1$. If the brightnesses of the two light-emitting diodes $LED_1$ and $LED_2$ are made equal to each other, these diodes will become easier to be viewed within the viewfinder.

As previously described, the shutter time indicating light-emitting diode $LED_1$ has already been forcibly turned off by the closing of switch $SW_5$ before the flashlight emission capability indicating pilot lamp $LED_2$ is turned on and therefore, it never happens that the two light-emitting diodes $LED_1$ and $LED_2$ are turned on at a time within the viewfinder. Accordingly, it is not possible to mistake the shutter time indicating light-emitting diode $LED_1$ for the flashlight emission capability indicating element.

When, in this light emission capable condition, the synchro switch $SW_4$ is closed at the time the shutter is fully opened, the trigger capacitor $C_3$ causes the discharge tube 8 to emit flashlight through the triggering transformer 9, whereby flashlight photography may be effected.

Description will now be made of the operation when the voltage of the power source $E_A$ has become lower than a predetermined value. At such time, the voltage from the camera side power source $E_A$ divided by the voltage dividing resistors $R_5$ and $R_6$ becomes smaller than the reference voltage $E_S$, so that the comparator $A_1$ produces an L level output. Accordingly, the currents from the current sources 5 and 6 are drawn into the comparator $A_1$ via diodes $D_2$ and $D_5$, respectively, and the transistors $Q_3$, $Q_4$ and $Q_9$, $Q_{11}$ are forcibly turned off. By the transistor $Q_4$ being turned off, the light-emitting diode $LED_1$ is turned off, thus indicating that photography is impossible. By the transistor $Q_{11}$ being turned off, the current from the circuit B stops flowing to the pilot lamp $LED_2$, so that the pilot lamp $LED_2$ is also forcibly turned off.

When the power source $E_A$ becomes so consumed and the voltage thereof drops below a predetermined value, the pilot lamp $LED_2$ which should indicate the capability or incapability of flashlight emission is also turned off and this eliminates the possibility of the photographer misconceiving that flashlight photography is possible.

Desicription will now be made of a case where the mechnical control means 20 has been rendered operative and the switches $SW_1$ and $SW_2$ have been connected to their contacts $b_1$ and $b_2$, respectively, so that shutter time control is effected in the mechanical control mode.

If the switch $SW_1$ is connected to its contact $b_1$ when the voltage of the power source $E_A$ drops below a predetermined value so that it has become impossible to control the shutter time by the electrical control mode, it becomes possible to effect flashlight photography in the mechanical control mode. At this time, the switch $SW_2$ is also connected to its contact $b_2$ in response to the switch $SW_1$ and therefore, when the charging voltage of the main capacitor $C_2$ of the flash device reaches a predetermined value, the great current from the flash device side power source $E_B$ flows through the connector $P_1$, the pilot lamp $LED_2$, the switch $SW_2$ and the connector $P_3$. Accordingly, the pilot lamp $LED_2$ is turned on independently of the transistor $Q_1$, the comparator $A_1$ and the power source $E_A$. That is, flashlight emission capability indication is effected only by the charged condition of the capacitor $C_2$.

While in the embodiment, the light-emitting element $LED_2$ has been employed as the flashlight emission capability indicating element, it may be replaced by a visual indicating element such as liquid crystal or an acoustic indicating element such as a buzzer.

In the embodiment, the driving current of the flashlight emission capability indicating element is supplied from the power battery provided in the electronic flash device side circuit B, but instead the driving current may be supplied to the indicating element from the power source $E_A$ disposed in the camera.

Although the invention has been described in detail with respect to the embodiment in which shutter time is electrically controlled, the invention is applicable to a camera in which diaphragm aperture is controlled electrically.

Thus, according to the device of the present invention, as has been described above, when the voltage of the camera side power source has dropped below a predetermined value, the flashlight emission capability indicating element is forcibly rendered inoperative so that it is impossible that the photographer misconceives the indication of the possibility of flashlight photography, and failure of photography can be prevented.

I claim:

1. In a camera usable with an electronic flash device, said camera including:
   (a) an indicating element adapted to be operated when said electronic flash device has become capable of emitting flashlight;
   (b) an electric control means for electrically adjusting at least one of a shutter time and a diaphragm aperture;
   (c) a voltage detecting circuit for detecting the voltage of a battery for driving said electric control means;
   the improvement comprising:
   a control circuit for rendering said indicating element inoperative in response to the output of said detecting circuit when the voltage of said battery is below a predetermined value, independently of whether or not said electronic flash device is in flashlight emission capable condition.

2. A camera according to claim 1, wherein said indicating element is a light-emitting element operated by the current from said electronic flash device, and said control circuit shuts off a current which tends to flow to said light-emitting element, in response to the output of said voltage detecting means.

3. A camera according to claim 1 further comprising:
   mechanical control means for mechanically adjusting said one of the shutter time and the diaphragm aperture;

selecting means for alternatively selecting said electric control means or said mechanical control means;

means responsive to said selecting means for forcibly rendering said control circuit inoperative when said selecting means selects said mechanical control means.

4. A camera according to claim 2, wherein said control circuit includes a transistor connected in series with said light-emitting element, and transistor being rendered conductive to permit the current from said electronic flash device to flow through said light-emitting element when the battery voltage exceeds the predetermined value and nonconductive to prevent flowing of the current through the light-emitting element when the battery voltage is below the predetermined value.

5. A camera according to claim 4, wherein said transistor regulates the current flowing through said light-emitting element to approximately a constant value.

6. A camera according to claim 1, further comprising a display element for indicating exposure information, and means for rendering said display element inoperative upon the operation of said indicating element at the latest.

7. In a camera usable with an electronic flash device detachable therefrom, said camera comprising:
connector means for electrically connecting said camera with said electronic flash device;
an indicating element operated by the current from said electronic flash device; and
means for regulating the current to approximately a constant value.

8. A camera according to claim 7, wherein said indicating element and said regulating means are connected in series with each other.

9. A camera according to claim 8, wherein said indicating element is a light-emitting element and said regulating means includes a transistor connected in series with said light-emitting element.

* * * * *

UNITED STATES PATENT AND TRADEMARK OFFICE
CERTIFICATE OF CORRECTION

PATENT NO.   :   4,431,291
DATED        :   February 14, 1984
INVENTOR(S)  :   OSAMU MAIDA It is certified that error appears in the above-identified patent and that said Letters Patent is hereby corrected as shown below:

Column 1, line 48, before "attempt" insert --will--.

Column 2, line 44, change "of" to --on--.

Column 4, line 48, change "resistors" to --resistor--;

line 56, change "light" to --line--.

Signed and Sealed this

First Day of May 1984

[SEAL]

Attest:

GERALD J. MOSSINGHOFF

Attesting Officer          Commissioner of Patents and Trademarks